Patented Sept. 4, 1945

2,384,050

UNITED STATES PATENT OFFICE 2,384,050

PROCESS FOR THE PREPARATION OF
α-NITRO-ISOBUTENE

Arthur Ernest Wilder Smith, Charles William Scaife, and Robert Holroyd Stanley, Norton-on-Tees, England, assignors to Imperial Chemical Industries Limited, a corporation of Great Britain No Drawing. Application December 15, 1943, Serial No. 514,419. In Great Britain December 4, 1942

1 Claim. (Cl. 260—644)

This invention relates to the production of α-nitro-isobutene.

The compound known as 1,2-dinitro-2-methylpropane, also known as alpha, beta-dinitroisobutane, is well-known, being disclosed by Michael and Carlson in the Journal of Organic Chemistry, volume 5, pages 1 to 13, which reference disclosed the preparation of this compound as the principal product in the reaction of anhydrous nitrogen tetroxide with isobutylene. These authors refer also to Ssidorenko (Chem. Zentralblatt 1907, I, page 399) who found that "nitrogen tetroxide acted upon isobutylene in ether solution to yield . . . as the main product a blue liquid, which gave a low yield of isobutylenediamine on reduction.

According to the present invention α-nitro-isobutene is prepared by reacting dinitro-isobutane with an aliphatic alcohol, the reaction apparently proceeding according to the equation:

$(CH_3)_2C.NO_2CH_2NO_2 + ROH \rightarrow$
$(CH_3)_2C:CHNO_2 + RONO + H_2O$ where ROH represents the alcohol.

Naturally the dinitro-isobutane referred to is 1,2-dinitro-isobutane, since it is not indeed possible to prepare the α-nitro olefine from any of the other compounds.

The temperature does not appear to be critical. At room temperature and below the reaction is slow, but it increases rapidly as the temperature is increased. In general, temperatures between 60° C. and 150° C. are suitable.

Example 30 grams of dinitro-isobutane were dissolved in 200 ccs. of methylated spirits and refluxed for 16 hours. The excess alcohol was then removed by distillation, when a residue consisting of an aqueous phase and a lachrymatory yellow oil was obtained. To the residue was added twice its volume of ether, and the mixture dried over sodium sulphate. After removing the ether by distillation, the residue was distilled, giving 14.9 grams of α-nitro-isobutene.

We claim:

A process for the preparation of α-nitro-isobutene which comprises reacting dinitro-isobutane with an aliphatic alcohol.

ARTHUR ERNEST WILDER SMITH.
CHARLES WILLIAM SCAIFE.
ROBERT HOLROYD STANLEY.